Feb. 25, 1930. M. E. EVERITT 1,748,835
PICKER
Filed Feb. 29, 1928
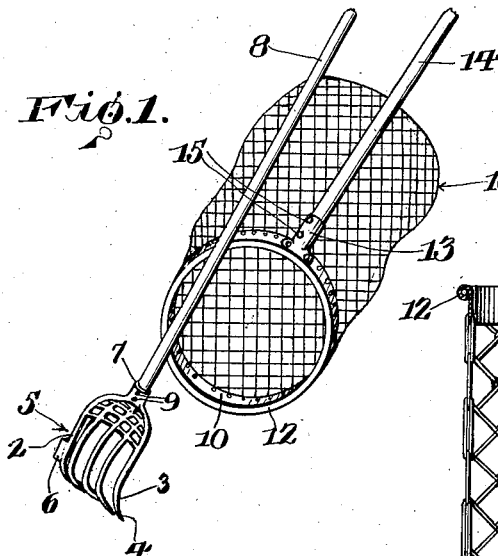
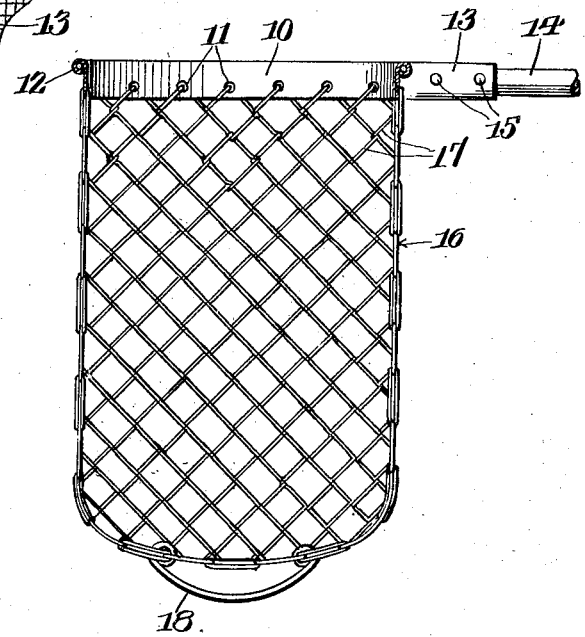
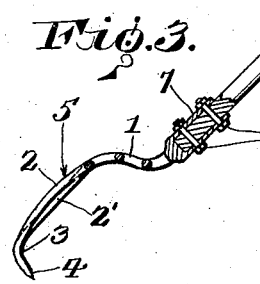
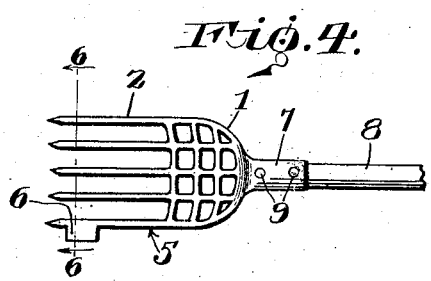
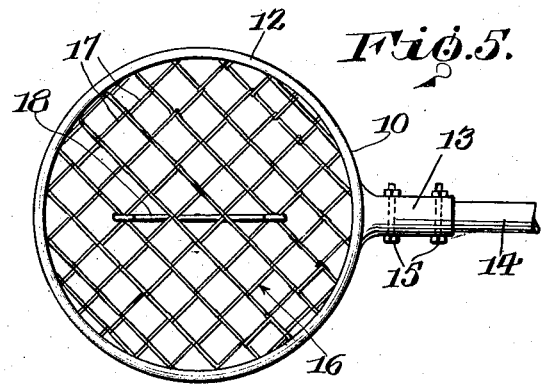
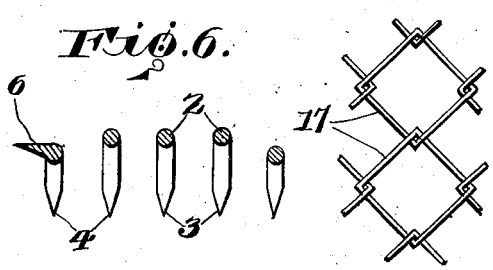
INVENTOR.
Mary E. Everitt,
BY
Geo. P. Kimmel
ATTORNEY.

Patented Feb. 25, 1930

1,748,835

UNITED STATES PATENT OFFICE

MARY E. EVERITT, OF FENWICK, MICHIGAN

PICKER

Application filed February 29, 1928. Serial No. 257,962.

This invention relates to a picker, designed primarily for the picking up of potatoes, but it is to be understood that a picker, in accordance with this invention, may be employed for the picking of cucumbers, fruit or for any other purposes for which it is found applicable, and the invention has for its object to provide, in a manner as hereinafter set forth, means for expeditiously picking up potatoes without the inconvenience of stooping and further without the soiling of the hands or gloves, these latter generally being worn by the operator.

Further objects of the invention are to provide, in a manner as hereinafter set forth, a picker for the purpose referred to which is simple in its construction and arrangement, strong, durable, compact, thoroughly efficient in its use, conveniently operated, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a perspective view, broken away, of a picker in accordance with this invention.

Figure 2 is a side elevation, partly broken away, of the receiver or container for the potatoes and with the receiver extended.

Figure 3 is a fragmentary view in longitudinal section of the picker element.

Figure 4 is a fragmentary view in top plan of the picker element.

Figure 5 is a top plan view of the container or receiver.

Figure 6 is a section on line 6—6 Figure 1.

Figure 7 is a fragmentary view of the body portion of the receiver or container.

A picker, in accordance with this invention, includes a picking element and a receiver or container for the potatoes picked up by the picking element. The container or receiver is positioned relatively to the picking element whereby when the latter picks up the potatoes they are discharged therefrom into the container or receiver.

The picking element comprises a body portion of lattice-like form and which is indicated at 1. The body portion 1 is of segmental contour in transverse section and arcuate in longitudinal section and is so formed whereby the outer end of said body portion 1 will be offset with respect to the inner end thereof. Formed integral with the outer end of the body portion 1 is a series of curved spaced tines 2 each having its forward portion inturned as at 3 and pointed as at 4. The setting up of the body portion 1 with the tines 2 in the manner as stated provides a substantially cup-shaped element referred to generally at 5 on Figure 1. One of the outer tines of the series of tines 2 is formed with a beveled outwardly extending cutter 6 which can be employed for cutting cucumbers if desired. The outer tines have a substantially straight inner portion 2' inwardly with respect to the inner tines. The inner end of the body portion 1, centrally thereof, is formed with an integral rearwardly extending socket member 7, into which extends the forward end of a handle member 8. That end of the member 8 which extends into the socket member 7 is fixedly secured therewith by holdfast devices 9. The handle member 8 is of appropriate length.

The container or receiver includes a hoop 10 provided with a series of spaced openings 11 and further formed with a reinforcing bead, on its periphery, as indicated at 12. The bead 12 is spaced from the openings 11. Secured to the periphery of the hoop 10 is a socket member 13 into which extends the forward end of a handle member 14. That end of the handle member 14 which extends into the socket member 13 is fixedly secured therewith by the holdfast devices 15. The handle member 14 is of appropriate length. The hoop 10 has connected therewith, through the medium of the openings 11, the body portion 16 of the container or receiver and said body portion is in the form of a mesh consisting of interengaging square links 17 formed from wire of appropriate diameter, certain of the links being connected to the hoop 10 by passage through the openings 11. The manner of setting up the body portion 16 permits of the same readily collapsing and extending. The bottom of the body portion 16, exteriorly thereof, has connected thereto a hand grip 18 which projects therefrom and which is employed for the purpose of conveniently dumping the container or receiver when desired.

The quickest way is to bunch the potatoes, then strike them, cribbing them into the receiver. They are to be picked up only to finish filling sacks.

The picker provides for expeditiously picking up potatoes and receiving the picked up potatoes until the container is filled, after which the latter can be conveniently emptied, and the picking up operation is had without the inconvenience of stooping or the soiling of the hands or gloves when worn, and therefore it is thought the many advantages of a picker, in accordance with this invention and for the purpose set forth, can be readily understood, and although the preferred embodiment of the invention is as illustrated and described, yet it is to be understood that changes in the details of construction can be had which fall within the scope of the invention as claimed.

What I claim is:

A picker comprising a cup-shaped picking element consisting of a lattice-like body portion of segmental cross section and of arcuate contour in longitudinal section, the outer end of said body portion being offset with respect to the rear end thereof, a series of spaced, parallel tines integral with the outer end of said body portion and each having its forward portion inturned and pointed and opposing said body portion, that part of each of the tines from the inturned portions thereof to the outer end of said body portion being of arcuate curvature lengthwise and offset with respect to the inner end of said body, and a handle secured to the rear end of said body portion.

In testimony whereof, I affix my signature hereto.

MARY E. EVERITT.